United States Patent
Hiyoshi et al.

(10) Patent No.: US 9,416,745 B2
(45) Date of Patent: Aug. 16, 2016

(54) INTERNAL-COMBUSTION-ENGINE CONTROL DEVICE AND CONTROL METHOD

(71) Applicant: NISSAN MOTOR CO., LTD., Yokohama-Shi, Kanagawa (JP)

(72) Inventors: Ryosuke Hiyoshi, Atsugi (JP); Shinobu Kamada, Kawasaki (JP); Sho Ohtsu, Zama (JP)

(73) Assignee: NISSAN MOTOR CO., LTD., Yokohama-shi, Kanagawa (JP)

( * ) Notice: Subject to any disclaimer, the term of this patent is extended or adjusted under 35 U.S.C. 154(b) by 0 days.

(21) Appl. No.: 14/760,270

(22) PCT Filed: Nov. 20, 2013

(86) PCT No.: PCT/JP2013/081227
§ 371 (c)(1),
(2) Date: Jul. 10, 2015

(87) PCT Pub. No.: WO2014/112201
PCT Pub. Date: Jul. 24, 2014

(65) Prior Publication Data
US 2015/0354488 A1 Dec. 10, 2015

(30) Foreign Application Priority Data

Jan. 17, 2013 (JP) .................................. 2013-006396

(51) Int. Cl.
*F02D 15/02* (2006.01)
*F02D 41/22* (2006.01)
(Continued)

(52) U.S. Cl.
CPC .............. *F02D 41/22* (2013.01); *F02B 75/045* (2013.01); *F02D 41/0005* (2013.01);
(Continued)

(58) Field of Classification Search
CPC ....... F02D 15/02; F02D 15/04; F02D 13/026; F02B 75/04; F02B 75/045; F02B 75/047; F02B 75/048
USPC .................................. 123/48 R, 90.15–90.16
See application file for complete search history.

(56) References Cited

U.S. PATENT DOCUMENTS

| 4,834,031 A * | 5/1989 | Katoh | ..................... F02B 75/04 |
| | | | 123/48 R |
| 6,260,532 B1 * | 7/2001 | Mendler | ............... F02F 7/0019 |
| | | | 123/192.2 |

(Continued)

FOREIGN PATENT DOCUMENTS

| EP | 2 511 501 A1 | 10/2012 |
| JP | H08-21295 A | 1/1996 |

(Continued)

Primary Examiner — Thomas Moulis
(74) Attorney, Agent, or Firm — Drinker Biddle & Reath LLP

(57) ABSTRACT

An internal combustion engine (1) that has a variable-compression-ratio mechanism (2) has variable valve mechanisms (7, 8) for an intake valve (4) and an exhaust valve (5), respectively. If a malfunction in the variable-compression-ratio mechanism (2), which controls a mechanical compression ratio via an electric motor (31), is detected from the amplitude of variations in an actual compression ratio, then if the fuel supply to the engine is cut, a throttle valve (14) is opened wider than would be the case if the variable-compression-ratio mechanism (2) were not malfunctioning, thereby reducing in-cylinder negative pressure during the intake stroke. Also, the timing with which the intake valve is closed is advanced and the timing with which the exhaust valve is opened is retarded, increasing the in-cylinder positive pressure during the compression and power strokes. This prevents the variable-compression-ratio mechanism (2) from increasing the compression ratio when control is lost.

8 Claims, 4 Drawing Sheets

(51) Int. Cl.
   *F02D 41/30*   (2006.01)
   *F02B 75/04*   (2006.01)
   *F02D 41/12*   (2006.01)
   *F02D 41/00*   (2006.01)
   *F02D 13/02*   (2006.01)

(52) U.S. Cl.
   CPC ........... *F02D 41/123* (2013.01); *F02D 41/221* (2013.01); *F02D 41/3076* (2013.01); *F02D 13/0207* (2013.01); *F02D 15/02* (2013.01); *F02D 2041/001* (2013.01); *F02D 2041/002* (2013.01); *F02D 2041/227* (2013.01); *Y02T 10/42* (2013.01)

(56) References Cited

U.S. PATENT DOCUMENTS

| | | | | |
|---|---|---|---|---|
| 6,443,107 | B1* | 9/2002 | Mendler | F02B 75/047 123/48 B |
| 6,453,854 | B1* | 9/2002 | Baeuerle | F02B 77/08 123/78 E |
| 6,662,768 | B2* | 12/2003 | Boyer | F02D 13/0234 123/316 |
| 6,665,605 | B2* | 12/2003 | Boyer | F01L 1/34 123/78 E |
| 6,732,041 | B2* | 5/2004 | Cullen | F02D 15/02 123/78 E |
| 7,213,543 | B2* | 5/2007 | Miyashita | F02D 15/00 123/48 C |
| 2003/0177987 | A1 | 9/2003 | Boyer et al. | |
| 2008/0133113 | A1 | 6/2008 | Yasui | |

FOREIGN PATENT DOCUMENTS

| | | |
|---|---|---|
| JP | 2004-116434 A | 4/2004 |
| JP | 2005-069204 A | 3/2005 |
| JP | 2009-062926 A | 3/2009 |
| JP | 2009-293497 A | 12/2009 |
| JP | 2010-185393 A | 8/2010 |
| WO | WO 2011/148514 A1 | 12/2012 |

* cited by examiner

INTERNAL-COMBUSTION-ENGINE CONTROL DEVICE AND CONTROL METHOD

TECHNICAL FIELD

The present invention relates generally to an internal combustion engine which includes a variable compression ratio mechanism configured to vary a mechanical compression ratio by varying a positional relationship between a piston and a cylinder, and particularly to a control apparatus and a control method for performing an operation against a failure in a drive mechanism of the variable compression ratio mechanism.

BACKGROUND ART

In the technical field of internal combustion engine, various types of variable compression ratio mechanisms have been known. For example, many variable compression ratio mechanisms have been proposed by the present applicant and others, in which a piston top dead center position is displaced vertically by varying a link geometry of a multi-link type piston crank mechanism. Patent documents 1 and 2 describe variable compression ratio mechanisms in which a mechanical compression ratio is varied by vertical displacement of a cylinder with respect to a central position of a crankshaft.

In such a variable compression ratio mechanism, when a drive mechanism for varying the compression ratio is failed, it may become impossible to control the compression ratio, so that the compression ratio may become higher than intended.

As a fail-safe function for such a failure in the drive mechanism, patent document 1 discloses adding a hydraulic circuit for abnormal condition, in a configuration that a cylinder side and a crank case side are configured to be moved relative to each other by a hydraulic drive mechanism. The hydraulic circuit for abnormal condition is configured to guide working oil between two hydraulic chambers, to allow the compression ratio to vary only to a lower compression ratio side, when the hydraulic drive mechanism is abnormal.

Patent document 2 discloses a variable compression ratio mechanism employing an electric motor as a drive mechanism, in which a helical torsion coil spring is provided to apply a force to bias the variable compression ratio mechanism toward the lower compression ratio side. In this mechanism, the biasing force becomes maximized, when the compression ratio is maximized. When the electric motor is failed, the variable compression ratio mechanism is promoted to return to a low compression ratio state by the biasing force of the helical torsion coil spring.

However, according to the configuration of patent document 1, the additional hydraulic circuit for abnormal condition is required, so that the configuration becomes complex, and it is impossible to handle an abnormality in the drive mechanism itself, such as leakage of oil pressure. This configuration is not applicable to cases where the drive mechanism is implemented by another type of mechanism than the hydraulic mechanism (for example, a mechanism employing an electric motor).

On the other hand, according to the configuration of patent document 2 which is biased toward the lower compression ratio side by the spring, when an actuator (electric motor, etc.) drives under a normal condition, the load of driving is large so that the actuator may have to be large-sized, which may adversely affect the fuel efficiency.

PRIOR ART DOCUMENT(S)

Patent Document(s)

Patent Document 1: JP 2010-185393 A
Patent Document 2: JP 2009-062926 A

SUMMARY OF THE INVENTION

According to the present invention, an internal combustion engine control apparatus comprises: a variable compression ratio mechanism configured to vary a mechanical compression ratio by varying a positional relationship between a piston and a cylinder; a fuel cut means configured to perform a fuel cut in a predetermined decelerating state; a failure detecting means configured to detect a failure in the variable compression ratio mechanism; and a failed-state control means configured to perform at least one of first and second operations, while the fuel cut is being carried out by the fuel cut means under condition that the variable compression ratio mechanism is failed, wherein the first operation is to set lower an in-cylinder negative pressure during suction stroke than while the fuel cut is being performed under condition that the variable compression ratio mechanism is normal, and wherein the second operation is to set higher an in-cylinder positive pressure during compression stroke to expansion stroke than while the fuel cut is being performed under condition that the variable compression ratio mechanism is normal.

Under the normal operating condition with combustion of fuel, the in-cylinder pressure during suction stroke is a negative pressure, but the in-cylinder pressure thereafter becomes high due to combustion pressure, so that the combustion pressure acts on the piston and a ceiling wall surface of a combustion chamber, and the variable compression ratio mechanism is biased basically in a direction to increase volumetric capacity of the combustion chamber, namely, in a direction to reduce the compression ratio. Accordingly, the compression ratio decreases gradually, even in a situation where the variable compression ratio mechanism fails to be actively controlled, due to some failure. However, when the fuel cut is being performed and no combustion is performed in decelerating state, the in-cylinder pressure during suction stroke is a negative pressure, and a condition is dominant where the negative pressure acts on the piston and the ceiling wall surface of the combustion chamber, so that the variable compression ratio mechanism may be shifted toward the higher compression ratio side.

In this regard, according to the present invention, under a condition that a failure is detected in the variable compression ratio mechanism, the in-cylinder negative pressure during suction stroke is set lower when the fuel cut is being operated, than under a condition that the variable compression ratio mechanism is normal. This suppresses the negative pressure from shifting the variable compression ratio mechanism toward the higher compression ratio side. Moreover, the increase of the in-cylinder positive pressure during compression stroke to expansion stroke acts in the direction to expand the volumetric capacity of the combustion chamber, and thereby suppresses the variable compression ratio mechanism from shifting toward the higher compression ratio side.

According to the present invention, it is possible to suppress the variable compression ratio mechanism from shifting toward the higher compression ratio side due to fuel cut operation, when the variable compression ratio mechanism is failed.

MODE(S) FOR CARRYING OUT THE INVENTION

The following describes an embodiment of the present invention in detail with reference to the drawings.

Figure 1:
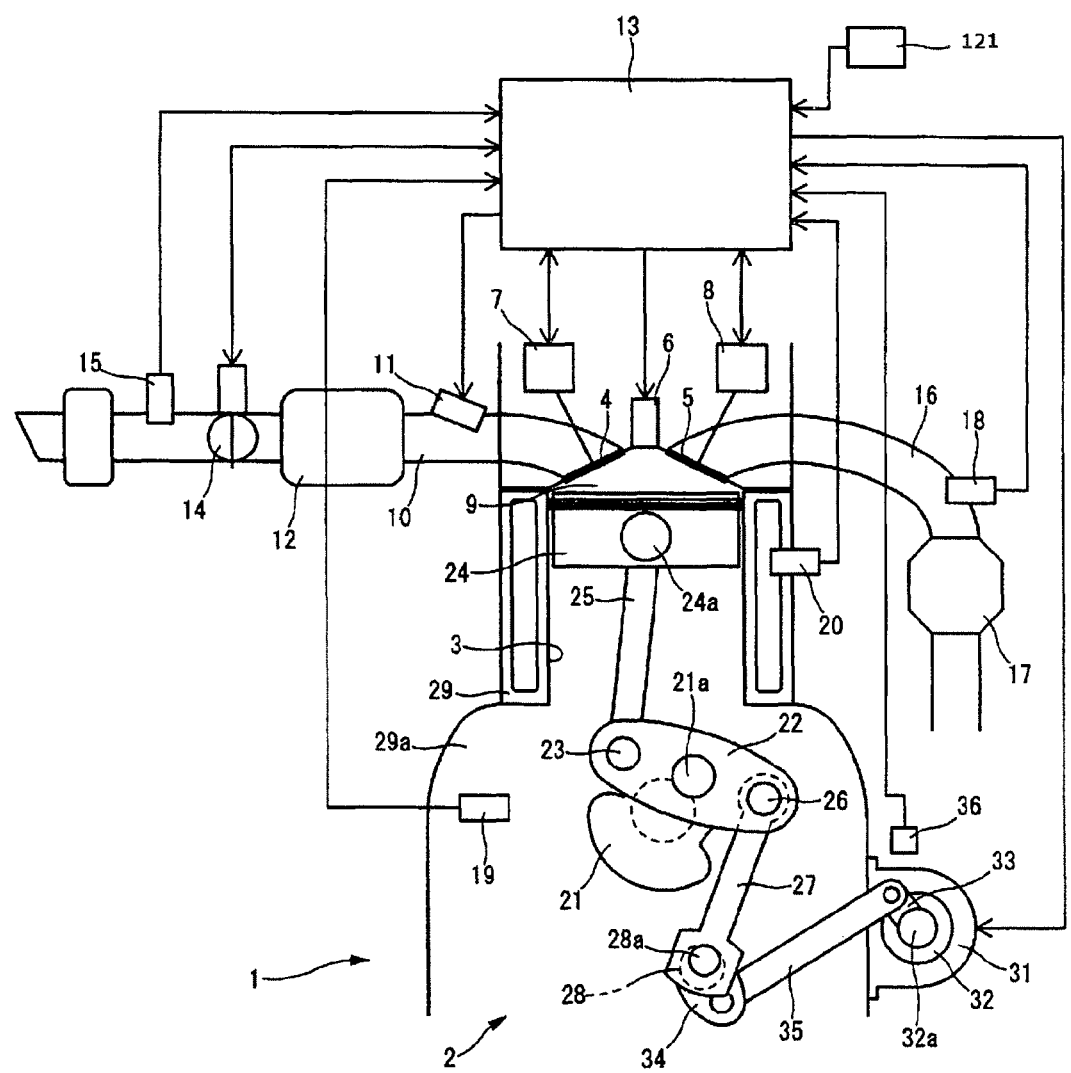
FIG. 1 is a configuration diagram showing system configuration of a control apparatus according to an embodiment of the present invention.

FIG. 1 shows system configuration of an automotive internal combustion engine 1 to which the present invention is applied. For example, internal combustion engine 1 is a four-stroke cycle, spark-ignition type internal combustion engine which is provided with a variable compression ratio mechanism 2 which employs a multi-link type piston crank mechanism. A pair of intake valves 4 and a pair of exhaust valves 5 are arranged at a ceiling wall surface of each cylinder 3, and an ignition plug 6 is arranged at a central portion surrounded by intake valves 4 and exhaust valves 5.

Intake valves 4 are provided with an intake-side variable valve mechanism 7 configured to control opening and closing timings of intake valves 4 variably. Exhaust valves 5 are provided with an exhaust-side variable valve mechanism 8 configured to control opening and closing timings of exhaust valves 5 variably. Variable valve mechanisms 7, 8 may be configured to vary the opening timing and the closing timing independently from each other, or may be configured to advance and retard the opening timing and the closing timing simultaneously with each other. The present embodiment employs the latter type, which is configured to advance and retard the phase of a camshaft.

A fuel injection valve 11 is provided per cylinder and arranged in an intake air passage 10 that is connected to a combustion chamber 9 via intake valves 4. An electronically controlled throttle valve 14 is disposed upstream of an intake air collector 12 in intake air passage 10, wherein the opening of throttle valve 14 is controlled based on a control signal from an engine controller 13. An air flow meter 15 is disposed further upstream of throttle valve 14, wherein air flow meter 15 senses an intake air quantity.

A catalytic device 17 is disposed in an exhaust gas passage 16 that is connected to combustion chamber 9 via exhaust valves 5, wherein catalytic device 17 is composed of a three-way catalyst. An air fuel ratio sensor 18 is disposed upstream of catalytic device 17 for sensing the air-fuel ratio.

Engine controller 13 receives input of sensing signals from sensors, such as air flow meter 15, air fuel ratio sensor 18, a crank angle sensor 19 for sensing the engine rotational speed, a water temperature sensor 20 for sensing the temperature of cooling water, and an accelerator opening sensor 121 for sensing the amount of depression of an accelerator pedal operated by a driver. Based on the sensing signals, engine controller 13 optimally controls the fuel injection quantity and injection timing of fuel injection valve 11, the ignition timing of ignition plug 6, the opening and closing timings of intake valves 4 and exhaust valves 5, the opening of throttle valve 14, and others.

On the other hand, variable compression ratio mechanism 2 employs a known multi-link type piston crank mechanism as disclosed by JP 2004-116434 A. Variable compression ratio mechanism 2 generally includes: a lower link 22 that is rotatably supported by a crank pin 21a of a crankshaft 21; an upper link 25 that links an upper pin 23 at a first end portion of lower link 22 and a piston pin 24a of a piston 24 to each other; a control link 27 that includes a first end connected to a control pin 26 at a second end portion of lower link 22; and a control shaft 28 that supports a second end of control link 27 for allowing swinging motion of control link 27. Crankshaft 21 and control shaft 28 are rotatably supported via a bearing structure not shown in a crank case 29a at a lower part of a cylinder block 29. Control shaft 28 includes an eccentric shaft part 28a whose location moves along with rotation of control shaft 28, and which is rotatably fitted with the end portion of control link 27. In variable compression ratio mechanism 2, the top dead center position of piston 24 travels upward and downward along with rotation of control shaft 28, thereby varying the mechanical compression ratio.

In this embodiment, as a drive mechanism for controlling the compression ratio of variable compression ratio mechanism 2 variably, an electric motor 31 is disposed at an outer wall surface of crank case 29a, wherein electric motor 31 has a central rotation axis parallel to crankshaft 21, and a speed reducer 32 is aligned with electric motor 31 in the axial direction. Speed reducer 32 is implemented by a harmonic drive mechanism having a large gear ratio, for example, and includes a speed reducer output shaft 32a that is disposed coaxially with an output shaft not shown of electric motor 31. Accordingly, speed reducer output shaft 32a and control shaft 28 are parallel to each other, and rotated simultaneously by a configuration that a first arm 33 fixed to speed reducer output shaft 32a and a second arm 34 fixed to control shaft 28 are linked with each other by an intermediate link 35.

When electric motor 31 rotates, the angle of speed reducer output shaft 32a varies with a significant speed reduction by speed reducer 32. The rotation of speed reducer output shaft 32a is transmitted from first arm 33 to second arm 34 via intermediate link 35, to rotate control shaft 28. This changes the mechanical compression ratio of internal combustion engine 1 as described above. In the shown example, first arm 33 and second arm 34 extend in opposite directions, so that when speed reducer output shaft 32a rotates in the clockwise direction, control shaft 28 rotates in the counterclockwise direction. However, this configuration may be modified so that speed reducer output shaft 32a and control shaft 28 rotate in the same direction.

An actual compression ratio, namely, an actual value of the mechanical compression ratio controlled variably by variable compression ratio mechanism 2 as described above, is sensed by an actual compression ratio sensor 36. For example, actual compression ratio sensor 36 is composed of a rotary-type potentiometer or rotary encoder for sensing the rotation angle of control shaft 28 or speed reducer output shaft 32a. Alternatively, the sensing of the actual compression ratio may be implemented without additional sensors by determining the amount of rotation of electric motor 31 based on the command signal to electric motor 31, and determining the rotation angle of control shaft 28 based of the amount of rotation of electric motor 31.

Electric motor 31 is controlled by engine controller 13 to be driven to conform the actual compression ratio obtained as described above to a target compression ratio corresponding to the operating condition.

In variable compression ratio mechanism 2 configured as described above, the force resulting from in-cylinder pressure, and the inertial force act on piston 24 that is supported via upper link 25. The in-cylinder pressure becomes a negative pressure during suction stroke, and becomes a positive pressure even in motoring during compression stroke and expansion stroke. In the normal operating state with combustion, the combustion pressure acts during expansion stroke. The inertial force acts in two vertical directions. Piston 24 is applied with these forces, so that control shaft 28 having eccentric shaft part 28a is applied with an alternating torque that forces control shaft 28 to rotate alternately in the direction to reduce the compression ratio and in the direction to increase the compression ratio.

When the drive mechanism including electric motor 31 is normal, the rotational angle position of control shaft 28 is maintained at a desired position (corresponding to a target compression ratio) against the alternating torque. In contrast, when the driving torque to control shaft 28 is lost by a failure in the drive mechanism such as a disconnection in electric motor 31, control shaft 28 oscillates in the rotational direction by the alternating torque, and gradually shifts toward the lower compression ratio side or the higher compression ratio side in conformance with the balance between the toques in the two directions.

In the normal operating state where combustion is performed in the cylinder, a high combustion pressure acts on piston 24 during expansion stroke, so that the torque to rotate control shaft 28 toward the lower compression ratio side is relatively large, and thereby control shaft 28 gradually shifts toward the lower compression ratio side.

However, during the fuel cut operation during deceleration in which no combustion is performed, no combustion pressure is applied, and the effect of the in-cylinder negative pressure during suction stroke becomes high, so that the torque to rotate control shaft 28 in the direction to increase the compression ratio becomes relatively large. In this situation, control shaft 28 gradually shifts toward the higher compression ratio side.

It is not preferable in view of occurrence of abnormal combustion that the compression ratio becomes excessively higher than the original target compression ratio. If the compression ratio becomes excessively high in relation to the opening and closing characteristics of intake valves 4 and exhaust valves 5, it causes a problem of interference between piston 24 and intake valves 4 and exhaust valves 5. In order to avoid the problem, it becomes necessary to provide a large valve recess that is too large in the normal operation.

In the present embodiment, a diagnosis is performed for a failure of variable compression ratio mechanism 2 including the drive mechanism employing the electric motor 31. When the fuel cut is performed during deceleration under the condition that a failure is detected, the in-cylinder negative pressure during suction stroke is set lower than under the normal condition, or the in-cylinder positive pressure during compression stroke to expansion stroke is set higher than under the normal condition.

Figure 2:
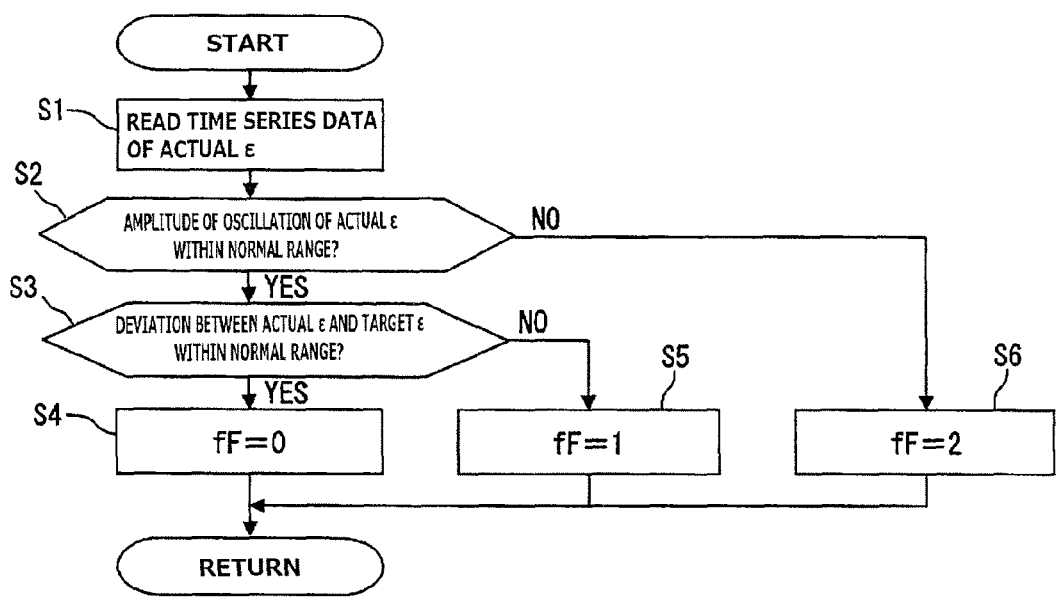
FIG. 2 is a flow chart showing a failure detecting control according to this embodiment.
Figure 3:
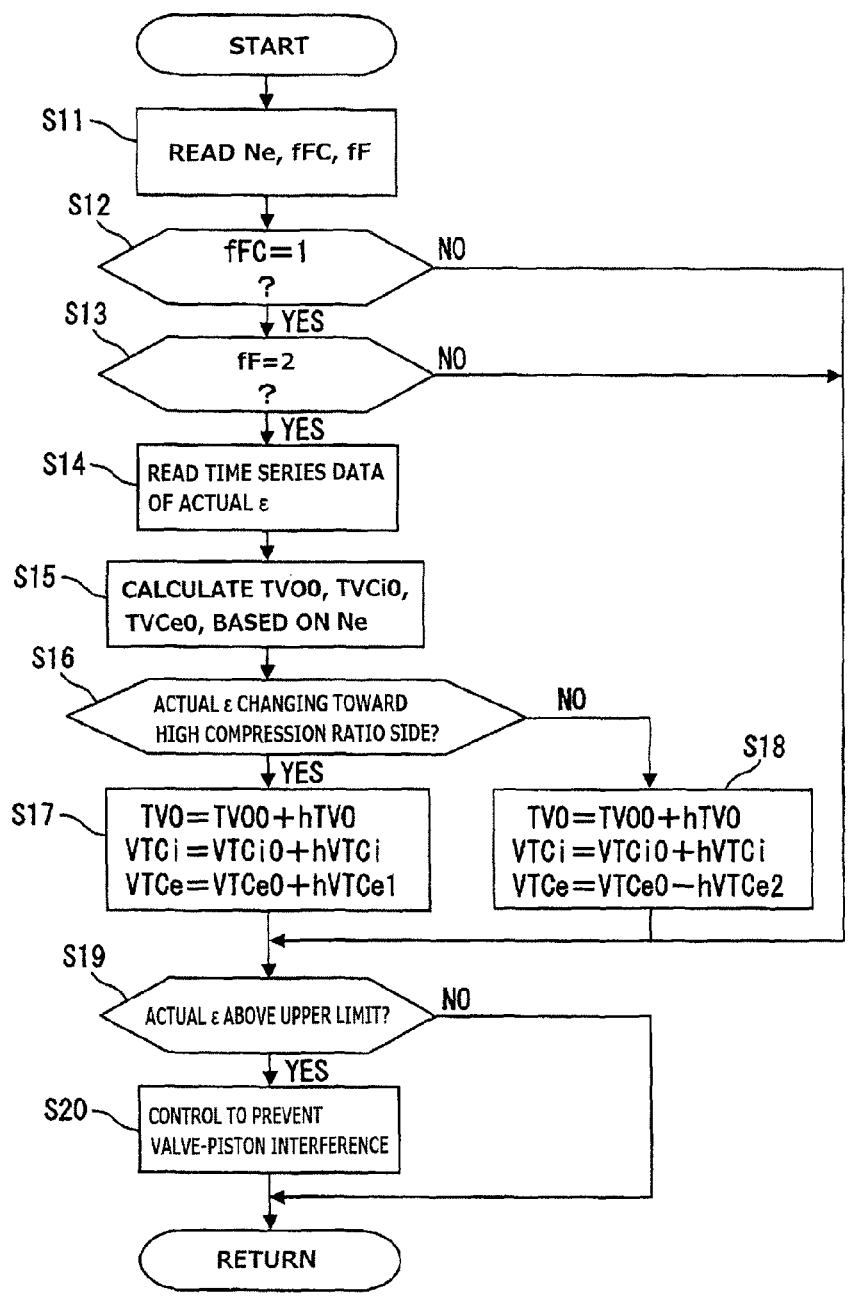
FIG. 3 is a main flow chart showing a flow of whole control.

The following describes a specific process with reference to flow charts of FIGS. 2 and 3.

FIG. 2 is a flow chart showing a flow of failure detecting operation. At Step S1, it reads time-series data of the actual compression ratio. The time-series data of the actual compression ratio is obtained at predetermined sampling intervals, and is stored in the form of a predetermined number of latest sampling data in a RAM of engine controller 13. At Step S2, based on the plurality of latest data of the actual compression ratio, it determines whether or not the amplitude of oscillation of the actual compression ratio (difference between maximum and minimum) shown by the time-series data is within a normal range.

When the amplitude of oscillation of the actual compression ratio is excessively large, it proceeds to Step S6 where a failure evaluation flag "fF" is set to "2". fF=2 indicates an uncontrollable state failure that no normal compression ratio control is performed by the drive mechanism, but variable compression ratio mechanism 2 is substantially in free state.

When the amplitude of oscillation of the actual compression ratio is within the normal range, it proceeds to Step S3 where it further determines whether nor not the deviation between the actual compression ratio and the target compression ratio is within a normal range.

When the deviation therebetween is within the normal range, it proceeds to Step S4 where failure evaluation flag fF is set to "0". fF=0 indicates that variable compression ratio mechanism 2 is not failed. When the deviation therebetween is excessively large, it proceeds to Step S5 where failure evaluation flag fF is set to "1". fF=1 indicates a stuck state failure that some portion of the drive mechanism from electric motor 31 to control shaft 28 is stuck so that the compression ratio cannot be changed. The stuck state failure where the compression ratio is fixed is out of the target of the operation of the present embodiment, because the compression ratio is never increased by the fuel cut operation.

FIG. 3 is a main flow chart showing a flow of whole control. At Step S11, it reads an engine rotational speed Ne, a fuel cut execution flag "fFc" indicative of execution of the fuel cut, and failure evaluation flag fF at the moment. fFC=1 indicates that the fuel cut is being executed, and fFc=0 indicates that the fuel cut is not being executed.

At Step S12, it determines whether or not fuel cut execution flag fFc is equal to 1, namely, whether or not the fuel cut is being executed. At Step S13, it determines whether or not failure evaluation flag fF is equal to 2, namely, whether or not it is in the uncontrollable state failure. When the answer at Step S12 or S13 is NO, it omits Steps S4 to S18, and proceeds to Step S19 described later.

When the answers at Steps S12 and S13 are YES, namely, when variable compression ratio mechanism 2 is in the uncontrollable state failure and the fuel cut is being executed, it proceeds to Step S14 where it reads the time series data of the actual compression ratio. It further proceeds to Step S15 where a basic throttle valve opening TVO0, a basic intake VTC advance quantity VTCi0, and a basic exhaust VTC retard quantity VTCe0 are calculated based on engine rotational speed Ne at the moment. The basic throttle valve opening TVO0 corresponds to a minimum opening with which a minimum required quantity of air can be obtained with respect to engine rotational speed Ne in the fuel cut operation.

Next, at Step S16, based on the time series data of the actual compression ratio read at Step S14, it determines whether or not the actual compression ratio is changing toward the higher compression ratio side.

When it is determined at Step S16 that the actual compression ratio is changing toward the higher compression ratio side, it proceeds to Step S17 where a target throttle valve opening TVO is set to a value that is obtained by adding a throttle valve opening increasing correction value hTVO to basic throttle valve opening TVO0. The opening of throttle valve 14 is controlled in conformance with the target throttle valve opening TVO. As the target throttle valve opening TVO increases, the opening of throttle valve 14 increases.

Moreover, a target intake VTC advance quantity VTCi is set to a value that is obtained by adding an intake VTC advancing correction value hVTCi to basic intake VTC advance quantity VTCi0. Intake-side variable valve mechanism 7 that advances and retards the opening and closing timings of intake valves 4 is controlled in conformance with target intake VTC advance quantity VTCi. The target intake VTC advance quantity VTCi is relative to the most retarded position. As target intake VTC advance quantity VTCi increases, the opening and closing timings of intake valves 4 become advanced. The intake valve closing timing based on basic intake VTC advance quantity VTCi0 is more retarded than the suction bottom dead center. The addition of intake VTC advancing correction value hVTCi causes the intake valve closing timing to advance and approach the suction bottom dead center.

Moreover, at Step S17, a target exhaust VTC retard quantity VTCe is set to a value that is obtained by adding an exhaust VTC retarding correction value hVTCe1 to basic exhaust VTC retard quantity VTCe0. Exhaust-side variable valve mechanism 8 that advances and retards the opening and closing timings of exhaust valves 5 is controlled in conformance with target exhaust VTC retard quantity VTCe. The target exhaust VTC retard quantity VTCe is relative to the most advanced position. As target exhaust VTC retard quantity VTCe increases, the opening and closing timings of exhaust valves 5 become retarded. The exhaust valve opening timing based on basic exhaust VTC retard quantity VTCe0 is more advanced than the expansion bottom dead center. The addition of exhaust VTC retarding correction value hVTCe1 causes the exhaust valve opening timing to retard and approach the expansion bottom dead center.

Figure 4:
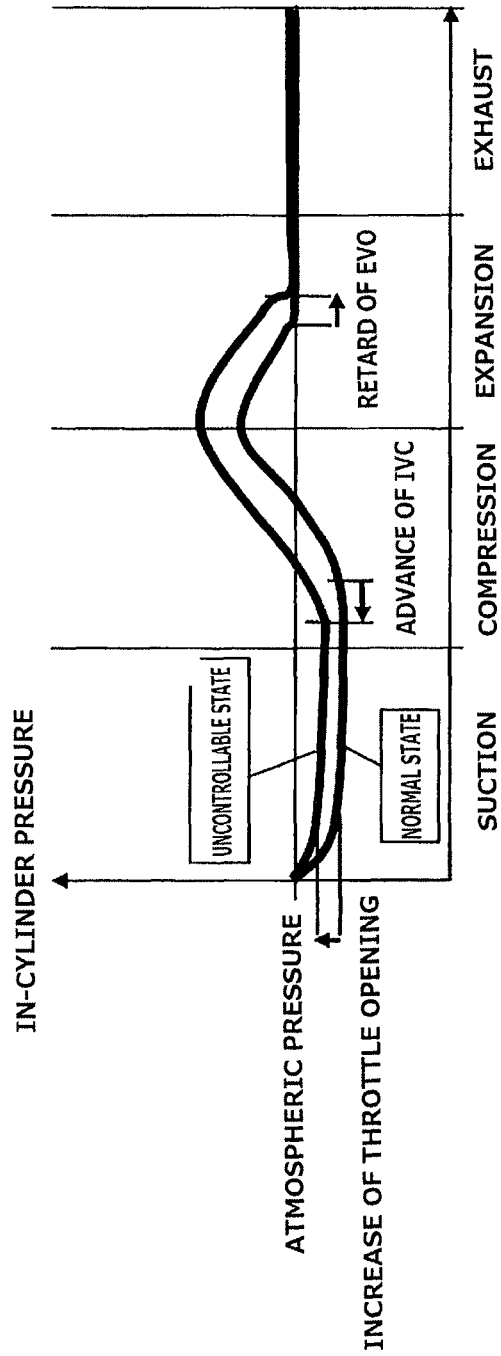
FIG. 4 is a characteristic diagram showing changes in in-cylinder pressure at fuel-cut operation, when a variable compression ratio mechanism is normal, and when the variable compression ratio mechanism is failed, in comparison.

By the operation of Step S17, the in-cylinder pressure during the fuel cut operation is set as shown in FIG. 4. Specifically, FIG. 4 shows characteristics of the in-cylinder pressure when variable compression ratio mechanism 2 is normal (namely, based on basic throttle valve opening TVO0, basic intake VTC advance quantity VTCi0, and basic exhaust VTC retard quantity VTCe0), and characteristics when it is determined that variable compression ratio mechanism 2 is in the uncontrollable state failure, and the correcting operation of Step S17 is performed, in comparison. Under the failed condition, the in-cylinder pressure is first raised as a whole by the increase correction of target throttle valve opening TVO. This reduces the in-cylinder negative pressure during suction stroke, and weakens the force biasing the piston 24 upward to the top dead center side. Moreover, the intake valve closing timing (IVC) approaches the suction bottom dead center, and the exhaust valve opening timing (EVO) approaches the expansion bottom dead center, so that the in-cylinder positive pressure during compression stroke and expansion stroke increases. This strengthens the force biasing the piston 24 toward the bottom dead center side.

As described above, in the uncontrollable state failure, variable compression ratio mechanism 2 tends to shift toward the lower compression ratio side or higher compression ratio side by the balance between the alternating torques in two directions, which are applied as reaction forces to control shaft 28. By varying the in-cylinder pressure as compared to the normal condition as described above, the tendency toward the lower compression ratio side is enhanced, so that the compression ratio of variable compression ratio mechanism 2 gradually decreases. Even if the relationship with the piston inertial force prevents shifting toward the lower compression ratio side, the shifting toward the higher compression ratio side is at least suppressed.

On the other hand, when it is determined at Step S16 that the actual compression ratio is not changing toward the higher compression ratio side (in most situations, the actual compression ratio is being changed toward the lower compression ratio side by the operation of Step S17), it proceeds to Step S18. At Step S18, it treats target throttle valve opening TVO and target intake VTC advance quantity VTCi similarly as at Step S17. Namely, target throttle valve opening TVO is set greater than under the normal condition, and target intake VTC advance quantity VTCi is set more advanced than under the normal condition.

On the other hand, target exhaust VTC retard quantity VTCe is set to a value that is obtained by subtracting an exhaust VTC advancing correction value hVTCe2 from basic exhaust VTC retard quantity VTCe0. As described above, the exhaust valve opening timing based on basic exhaust VTC retard quantity VTCe0 is more advanced than the expansion bottom dead center. The subtraction of exhaust VTC retarding correction value hVTCe1 causes the exhaust valve opening timing to be more advanced than under the normal condition.

By advancing the exhaust valve opening timing during expansion stroke in this way, the engine braking effect can be enhanced without increase of suction negative pressure. Namely, in the state where the compression ratio is prevented from becoming excessively high by the operation of Step S17, the excessively high compression ratio is prevented by the increase of target throttle valve opening TVO and the advance of target intake VTC advance quantity VTCi, and the engine braking torque is ensured by the advance of target exhaust VTC retard quantity VTCe.

The next steps S19 and S20 are to prevent possible interference between piston 24 and intake valves 4 and exhaust valves 5 in proximity to the top dead center. At Step S19, it determines whether or not the actual compression ratio at the moment is greater than or equal to an upper limit determined in account of prevention of the interference. The upper limit of compression ratio is calculated based on an actual intake VTC advance quantity rVTCi and an actual exhaust VTC retard quantity rVTCe, for example. Then, when the actual compression has reached the upper limit, at Step S20, it performs an interference prevention control with high priority. Specifically, it corrects target intake VTC advance quantity VTCi to the retard side, and corrects target exhaust VTC retard quantity VTCe to the advance side. Namely, the interference with piston 24 is prevented by the retard of the intake valve opening timing and the advance of the exhaust valve closing timing. This interference prevention control is performed with high priority to the operations of Steps S17 and S18, irrespective of whether variable compression ratio mechanism 2 is failed and whether the fuel cut is being executed. The interference prevention control may be implemented by the control of actively increasing the distance between piston 24 and intake valves 4 and exhaust valves 5 as described above, or by limiting the maximum values of target intake VTC advance quantity VTCi and target exhaust VTC retard quantity VTCe depending on the actual compression ratio.

Although the present invention is described with reference to one specific embodiment, the invention is not limited to the embodiment but may be modified variously. For example, although all of the increase of the throttle valve opening, the advance of the intake valve closing timing, and the retard of the exhaust valve opening timing are performed simultaneously at Step S17 for prevention of excessively high compression ratio in the present embodiment, it may be modified so that only one or two of them are performed. For example, the present invention is applicable to internal combustion engines provided with no variable valve mechanisms 7, 8.

Although variable compression ratio mechanism 2 configured to vary the compression ration by varying the top dead center position of piston 24 vertically is employed in this embodiment, the present invention is applicable to variable compression ratio mechanisms as disclosed in patent documents 1 and 2 where the cylinder side is moved vertically. The actuator for varying the compression ratio in variable compression ratio mechanism 2 is not limited to electric motor 31 in the present embodiment, but the present invention is applicable to cases where the actuator is a hydraulic actuator.

The invention claimed is:

1. An internal combustion engine control apparatus comprising:
   a variable compression ratio mechanism configured to vary a mechanical compression ratio by varying a positional relationship between a piston and a cylinder;
   a fuel cut section configured to perform a fuel cut in a predetermined decelerating state;
   a failure detecting section configured to detect a failure in the variable compression ratio mechanism; and
   a failed-state control section configured to perform at least one of first and second operations, while the fuel cut is being carried out by the fuel cut section under condition that the variable compression ratio mechanism is failed, wherein the first operation is to set lower an in-cylinder negative pressure during suction stroke than while the fuel cut is being performed under condition that the variable compression ratio mechanism is normal, and wherein the second operation is to set higher an in-cylinder positive pressure during compression stroke to expansion stroke than while the fuel cut is being performed under condition that the variable compression ratio mechanism is normal.

2. The internal combustion engine control apparatus as claimed in claim 1, further comprising a throttle valve configured to control an intake air quantity, wherein the failed-state control section is configured to set larger an opening of the throttle valve than under condition that the variable compression ratio mechanism is normal.

3. The internal combustion engine control apparatus as claimed in claim 1, further comprising an intake-side variable valve mechanism configured to vary an intake valve closing timing, wherein the failed-state control section is configured to set the intake valve closing timing more advanced toward intake bottom dead center than under condition that the variable compression ratio mechanism is normal.

4. The internal combustion engine control apparatus as claimed in claim 1, further comprising an exhaust-side variable valve mechanism configured to vary an exhaust valve opening timing, wherein the failed-state control section is configured to set the exhaust valve opening timing more retarded toward expansion bottom dead center than under condition that the variable compression ratio mechanism is normal.

5. The internal combustion engine control apparatus as claimed in claim 1, further comprising an exhaust-side variable valve mechanism configured to vary an exhaust valve opening timing, wherein the failed-state control section is configured to set lower the in-cylinder negative pressure during suction stroke, and set the exhaust valve opening timing more advanced away from expansion bottom dead center, than under condition that the variable compression ratio mechanism is normal.

6. The internal combustion engine control apparatus as claimed in claim 1, further comprising:
   an intake-side variable valve mechanism configured to vary an intake valve opening timing; and
   an actual compression ratio sensing section configured to sense an actual compression ratio of the variable compression ratio mechanism;
   wherein the failed-state control section is configured to set the intake valve opening timing more retarded with high priority, when the actual compression ratio is greater than or equal to a predetermined value.

7. The internal combustion engine control apparatus as claimed in claim 1, further comprising:
   an exhaust-side variable valve mechanism configured to vary an exhaust valve closing timing; and
   an actual compression ratio sensing section configured to sense an actual compression ratio of the variable compression ratio mechanism;
   wherein the failed-state control section is configured to set the exhaust valve closing timing more advanced with high priority, when the actual compression ratio is greater than or equal to a predetermined value.

8. An internal combustion engine control method for an internal combustion engine, wherein the internal combustion engine includes a variable compression ratio mechanism configured to vary a mechanical compression ratio by varying a positional relationship between a piston and a cylinder, and is configured to perform a fuel cut in a predetermined decelerating state, the internal combustion engine control method comprising:
   detecting a failure in the variable compression ratio mechanism; and
   performing at least one of first and second operations, while the fuel cut is being carried out under condition that the variable compression ratio mechanism is failed, wherein the first operation is to set lower an in-cylinder negative pressure during suction stroke than while the fuel cut is being performed under condition that the variable compression ratio mechanism is normal, and wherein the second operation is to set higher an in-cylinder positive pressure during compression stroke to expansion stroke than while the fuel cut is being performed under condition that the variable compression ratio mechanism is normal.

\* \* \* \* \*